Patented Aug. 18, 1925.

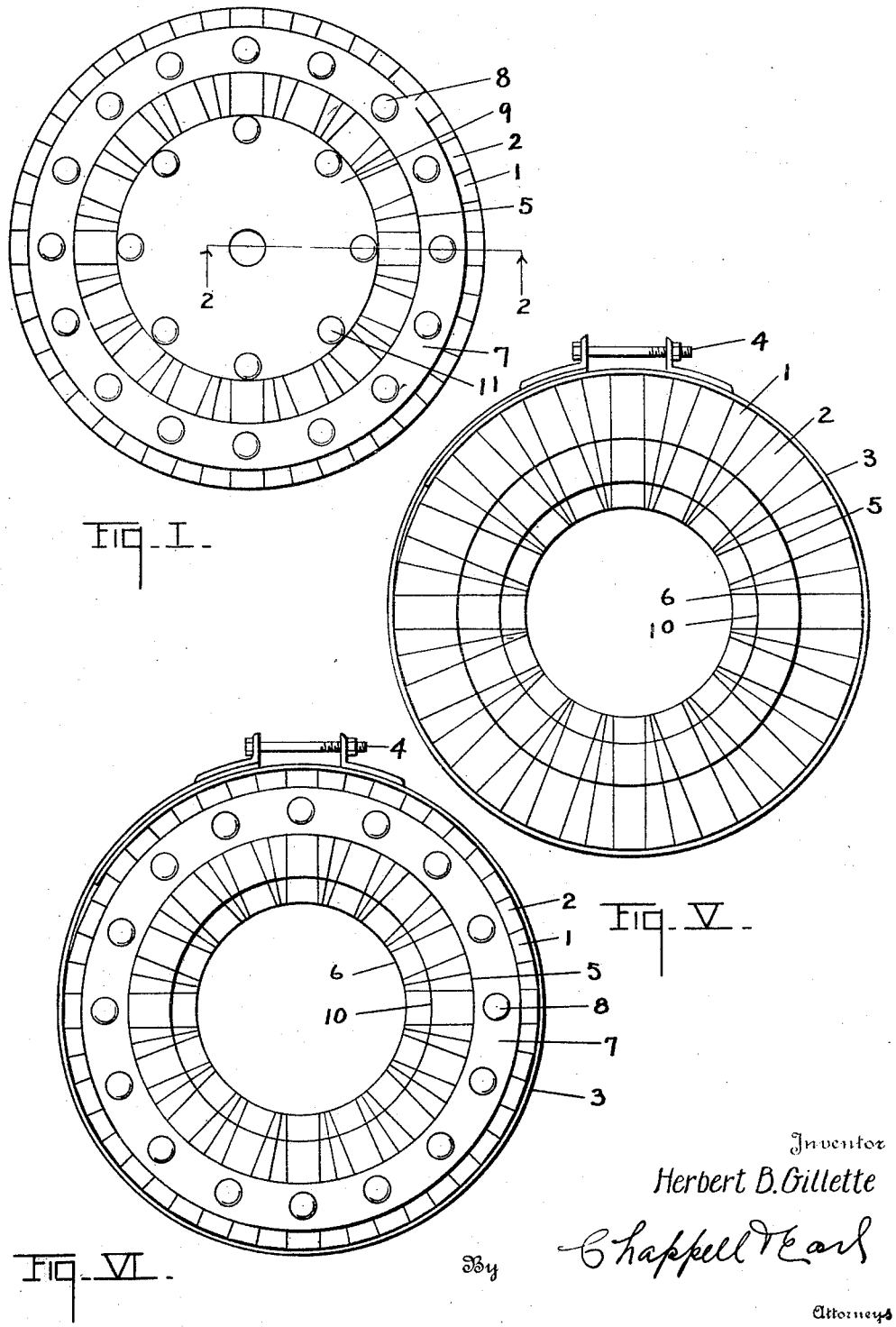

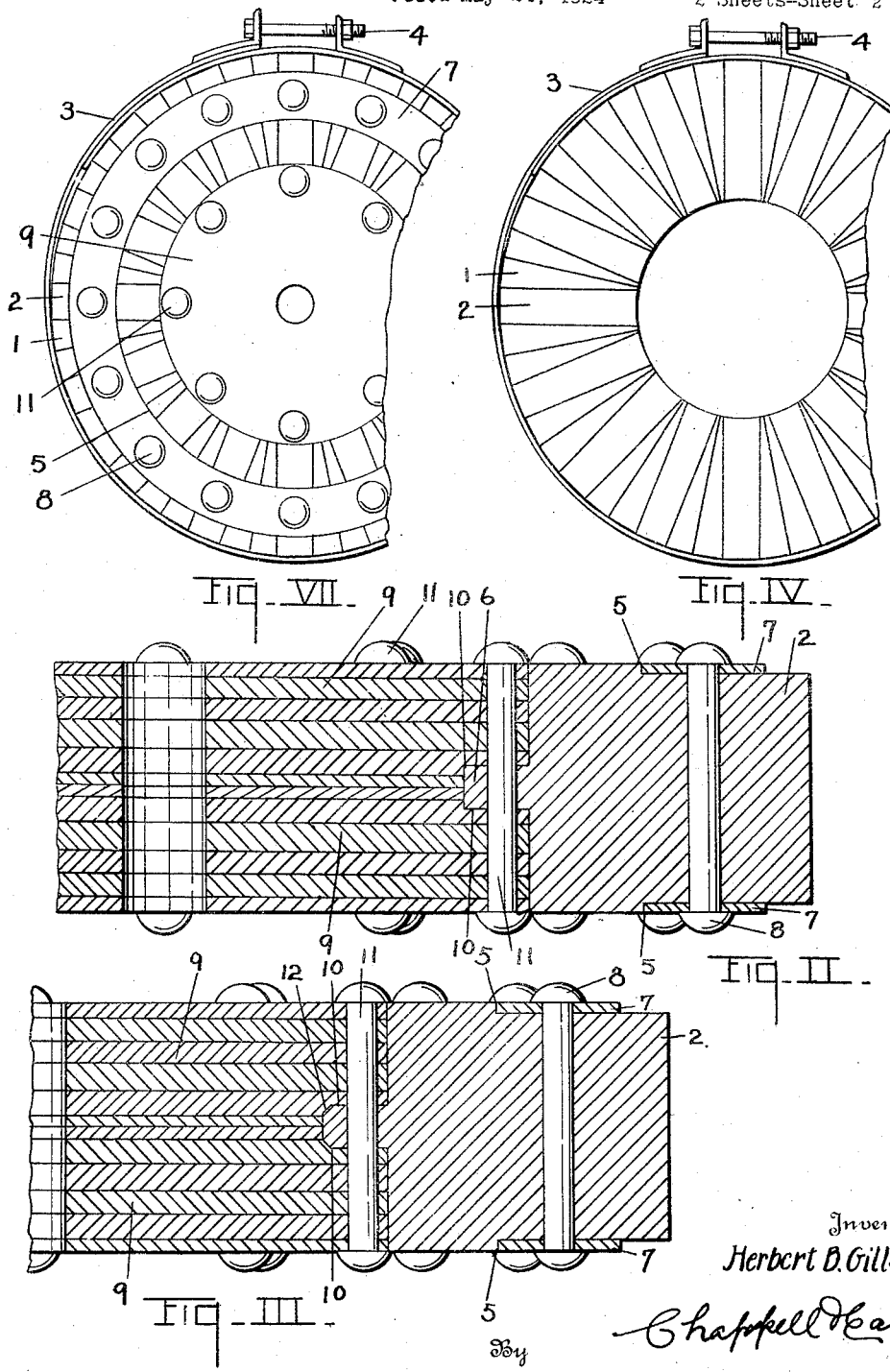

1,549,863

UNITED STATES PATENT OFFICE.

HERBERT B. GILLETTE, OF GRAND RAPIDS, MICHIGAN.

METHOD OF MANUFACTURING WOOD WHEELS.

Application filed May 24, 1924. Serial No. 715,574.

*To all whom it may concern:*

Be it known that I, HERBERT B. GILLETTE, a citizen of the United States, residing at Grand Rapids, county of Kent, State of Michigan, have invented certain new and useful Improvements in Methods of Manufacturing Wood Wheels, of which the following is a specification.

This invention relates to an improved method of manufacturing wood wheels such as claimed in my copending application Serial No. 715,573.

The main objects of this invention are:

First, to provide an improved method of manufacturing wheels which enables the rapid and economical assembling of the parts.

Second, to provide an improved method of manufacturing wheels which enables the manufacture of wheels which are very strong and durable.

Objects pertaining to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this application, in which:

Fig. I is a side elevation of a wheel manufactured by my improved method.

Fig. II is a radial section thereof on line 2—2 of Fig. I looking in the direction of the arrows.

Fig. III is a radial section of a slight modification of my invention.

Fig. IV is a side view, partially broken away, illustrating the first two steps in the assembling of the wheel.

Fig. V is a side elevation illustrating the third step in the assembling of the wheel.

Fig. VI is a side elevation illustrating the fourth step in the assembling of the wheel.

Fig. VII is a fragmentary side elevation illustrating the fifth step in the assembling of the wheel.

Similar reference numerals refer to similar parts throughout the several views.

In the manufacture of wheels by my improved method I provide an annular body member formed of a plurality of radially disposed blocks, the blocks in the structure illustrated having a plurality of wedge-shaped blocks 1 and rectangular blocks 2 arranged with a pair of wedge-shaped blocks between each rectangular block.

After these blocks are assembled they are upset by peripheral pressure as by means of the clamp 3, which is provided with a clamping bolt 4, the assembling of the blocks constituting the first step, and the upsetting thereof the second step. While thus assembled and held by the upsetting means, the assembled blocks are machined to provide the annular shoulders 5 and the internal flange 6. The clamping rings 7 are then applied, the rings being of such dimensions that their inner edges engage the shoulders 5, the rings being secured by the clamping rivets 8 which are preferably arranged through the rectangular blocks.

I then insert the center members 9 which are preferably formed of multiply wood, each member in the structure illustrated having six plies. These center members are forced into the body member under pressure so that the blocks constituting the body of the wheel are supported thereby throughout. The center members are rabbeted at 10 to receive the flange 6 and are secured and clamped upon the flange by means of the cross rivets 11.

In the modification shown in Fig. III the corners of the flange are bevelled off at 12, thus avoiding the necessity of such accurate machining as required in the structure of Fig. II. The upsetting clamp may be removed after the rings 7 are secured in position, although it is preferably left on until the wheel is completely assembled as shown in Fig. VII.

The wheels manufactured according to my improved method may be formed of material which is generally regarded as waste, such as the cuttings in various manufacturing establishments. The wheels may be rapidly assembled and are very strong and rigid.

Having thus described my invention what I claim as new and desire to secure by Letters Patent is:

1. The method of manufacturing wheels, comprising assembling a plurality of wedge-shaped blocks and a plurality of rectangular blocks in a radial relation to provide an annular body, there being a plurality of wedge-shaped blocks between each of the rectangular blocks, upsetting the blocks so assembled by means of a peripheral clamp, machining the sides of the blocks while supported by the clamp to form outwardly facing side shoulders and an internal central annular flange, securing clamping rings upon the sides of the blocks with their inner edges in engagement with said shoulders by means of rivets disposed through the rectangular blocks prior to the removal of the upsetting clamp, and fitting a pair of disk-like center members formed of multiply wood into said body and clamping upon said flange by rivets disposed therethrough, said center members being rabbeted to receive said flange.

2. The method of manufacturing wheels, comprising assembling a plurality of wedge-shaped blocks and a plurality of rectangular blocks in a radial relation to provide an annular body, there being a plurality of wedge-shaped blocks between each of the rectangular blocks, upsetting the blocks so assembled by means of a peripheral clamp, machining the sides of the blocks while supported by the clamp to form outwardly facing side shoulders and an internal central annular flange, securing clamping rings upon the sides of the blocks with their inner edges in engagement with said shoulders and fitting a pair of disk-like center members into said body and clamping upon said flange.

3. The method of manufacturing wheels, comprising assembling a plurality of blocks in a radial relation to provide an annular body, upsetting the blocks so assembled, machining the sides of the blocks while supported by the upsetting means to form outwardly facing side shoulders and an internal central annular flange, securing clamping rings upon the sides of the blocks in engagement with said shoulders by means of cross rivets prior to removal from the upsetting means, and fitting a pair of disk-like center members into said body and clamping upon said flange by rivets disposed therethrough, said center members being rabbeted to receive said flange.

4. The method of manufacturing wheels, comprising assembling a plurality of blocks in a radial relation to form an annular body, upsetting the blocks so assembled, machining the sides of the blocks while so upset to form outwardly facing side shoulders and an internal annular flange, securing clamping rings upon the sides of the blocks in engagement with said shoulders, and forcing a pair of disk-like center members into said body and clamping upon said flange.

In witness whereof, I have hereunto set my hand.

HERBERT B. GILLETTE.